Patented Aug. 14, 1951

2,564,024

UNITED STATES PATENT OFFICE 2,564,024

METHOD OF MAKING HALOCARBON POLYMERS

William T. Miller, Ithaca, N. Y., assignor to the United States of America as represented by the United States Atomic Energy Commission No Drawing. Application May 21, 1948, Serial No. 28,520

9 Claims. (Cl. 260—92.1)

This application is a continuation-in-part of my application Serial No. 730,176, filed February 21, 1947.

This invention relates to a method of making polymers consisting essentially of carbon and halogen with a high fluorine content, and more particularly to a method of making polytrifluoromonochloroethylene and polydifluorodichloroethylene.

Polymers consisting substantially completely of carbon and halogen and containing a high proportion of fluorine, because of their high chemical inertness have recently come to be of considerable interest in connection with the handling of corrosive substances.

One object of the invention is to provide a method of making polymers consisting essentially of carbon and halogen with a high percentage of fluorine, that are of relatively high molecular weight.

Another object of the invention is to provide a method of making such polymers that is convenient, safe and inexpensive.

Still another object of the invention is to devise a method of making such polymers which further are substantially free from hydrogen groups.

Other objects will appear hereinafter.

According to the invention, these objects may be accomplished by heating a compound selected from the group of trifluoromonochloroethylene and the difluorodichloroethylenes in the presence of elemental oxygen as a polymerization promoter. A useful range of temperatures for carrying out the process is about 40° C. to about 150° C. and a preferred range of temperatures is about 60° C. to about 100° C. The polymerization is suitably carried out at atmospheric or elevated pressure. It is preferable to have oxygen present in a concentration of 0.001%–0.4% based on the weight of the monomer, and better 0.001%–0.05%. When oxygen is present in appreciably higher concentrations the yield of polymer tends to decrease, apparently because of oxidation reactions which compete with the polymerization reaction. In accordance with the present invention oxygen is used in a concentration such that it functions primarily as a polymerization promoter.

I have found that, in many instances, in polymerization processes in which relatively low temperatures are used polymers of relatively high molecular weight tend to be produced, and that the converse of this is true. Thus, for example, I have passed tetrafluoroethylene continuously through a hot tube at temperatures of the order of 650° C. and have thereby produced the dimer and a compound of the formula $C_3F_6$. On the other hand, in an application of myself jointly with Albert L. Dittman and Sherman K. Reed, Serial No. 773,292, filed September 10, 1947, experiments are described in which trifluoromonochloroethylene is polymerized in the presence of trichloroacetyl peroxide at temperatures of the order of 0° C. and an exceedingly high molecular weight polymer, e. g., a plastic, is produced. The method of the present invention is useful when it is desired to produce polymers consisting essentially of carbon and halogen with a high fluorine content that are of relatively high molecular weight. It has been found that it is feasible to polymerize the fluorochloroolefins mentioned by heating the olefin in the presence of oxygen at moderately elevated temperatures; owing to the fact that the process is carried out at moderate temperatures, polymers of relatively high molecular weight are produced.

Another advantage of the present invention is that it is adapted to "bulk polymerization," that is, polymerization in the absence of a solvent or suspension agent. Bulk polymerization is convenient because the polymer readily separates from the monomer in which it is substantially insoluble and thus recovery of the polymer is easily accomplished. The present method is adapted to this procedure because at the moderate temperatures used the reaction proceeds at a moderate rate of speed and good heat transfer is attained.

Experiments have been carried out which indicate that the mechanism of polymerization involves the formation of an olefin peroxide in situ by combination of the oxygen with the olefin, which peroxide then decomposes to give free radicals. The free radicals produced take part in a free radical-chain type polymerization. It has also been found that it is possible to form the peroxide at relatively low temperatures without substantial decomposition, and then decompose the peroxide at higher temperatures and bring about polymerization. According to the invention, therefore, polymerization of the class of fluorochloroolefins indicated is preferably carried out by maintaining the olefin in contact with elemental oxygen at a temperature conducive to the formation of the olefin peroxide and unfavorable for its decomposition, e. g., at about −20° C. or below, to build up an appreciable concentration of the olefin peroxide in the olefin; and thereafter heating the olefin containing the peroxide at a temperature within a range indicated above to decompose the peroxide and cause polymerization to take place.

The present method has certain advantages over other methods of polymerization. For example, trifluoromonochloroethylene may be polymerized in the presence of organic peroxide promoters such as benzoyl peroxide or acetyl peroxide. In such processes hydrogen containing fragments of the promoter may enter the polymer chains. However, the presence of even a small percentage of hydrogen in the polymeric product may appreciably decrease its resistance to corrosive substances, particularly elemental fluorine. In the present method, on the other hand, there is no means by which hydrogen can be introduced.

Improved processes have been developed in which the amount of hydrogen that may be introduced into the polymer chains is substantially reduced or in which substantially no hydrogen is introduced. Thus, in application Serial No. 773,292 referred to above a process is disclosed of polymerizing an olefin such as trifluoromonochloroethylene in the presence of a halogen substituted acetyl peroxide promoter, particularly a completely halogenated acetyl peroxide, e. g., dichlorofluoroacetyl peroxide, trichloroacetyl peroxide. These completely halogenated acetyl peroxides decompose appreciably already at about room temperature and furthermore may decompose with explosive violence. Hence special precautions must be taken to store these peroxides safely until they are used. Thus they are suitably stored by dissolving them in a solvent such as trichlorofluoromethane and maintaining them at sub-zero temperatures. On the other hand, by means of the present invention polymers consisting essentially of carbon and halogen with a high fluorine content containing substantially no hydrogen can be produced and an olefin peroxide promoter can be formed in situ and directly used in the polymerization.

The following examples illustrate the method of the present invention. The "no strength temperature" (abbreviated N. S. T.) of the polymers that are given were obtained in the manner described in my application Serial No. 730,176.

Example 1

89.3 gs. of trifluoromonochloroethylene which had been previously purified by distillation from $P_2O_5$ and then through silica-gel was pumped into a 300 cc. heavy wall Pyrex glass bomb at $-78°$ C. The bomb was cooled to $-190°$ C. and was connected to a vacuum pump to empty it of gas. In order to introduce oxygen to serve as a promoter for the polymerization, the open bomb was then stored in the dark under pure gaseous oxygen for about 3 days at $-78°$ C. The bomb was then sealed and placed in a shaker in a dark place, after which the temperature was raised to $70°$ C. and then maintained between $54°$ and $70°$ C. for 19 hours. About 24.6 gs. of polytrifluoromonochloroethylene having a Fisher-Johns melting point range of $208°$–$212°$ C. was recovered.

Example 2

A stainless steel container with a capacity of 2.6 l. was charged with about 1650 gs. of trifluoromonochloroethylene that had been purified by distillation from $P_2O_5$. The container, cooled by means of solid carbon dioxide, was pumped until all the air was displaced by olefin vapor. Oxygen was then introduced into the container in an amount sufficient to increase the pressure by 200 mms. The container was sealed and heated at $60$–$65°$ C. under agitation for about 44 hours. About 71 gs. of a polymer having a Fisher-Johns melting point of $206$–$207°$ C. was recovered.

The polymer thus produced was useful as a starting material for the production of a valuable, highly stable lubricant by my process of thermal cracking.

Example 3

A 1-l. flask was evacuated and charged with 800 mls. liquid trifluoromonochloroethylene. Oxygen was bubbled through the monomer for 10 minutes at about $-78°$ C. and then an oxygen pressure of 1 inch of mercury greater than atmospheric was maintained while the monomer was refluxed with a condenser cooled by solid carbon dioxide. Refluxing was carried on intermittently over a period of about 2 days; the monomer was refluxed for a total of about 18 hours and in the intervals between reflux times the reaction mixture contained in the flask was kept in a Dewar apparatus containing solid carbon dioxide. In order to determine the presence of a peroxide after this treatment a sample of the reaction mixture was tested by the following method. The sample was added to an alcoholic solution of potassium iodide, acetic acid and sodium acetate, the mixture was warmed and the liberated iodine was titrated with a standard aqueous solution of sodium thiosulfate. By this method a peroxide was found to be present equivalent to about 0.035% of trichloroacetyl peroxide. Another sample weighing about 44 gs. of the reaction mixture was warmed and kept at a temperature between $50°$ C. and $60°$ C. for about 45 hours. About 5 gs. of a solid polymer having a N. S. T. of $220°$ C., representing a yield of about 11%, was recovered.

Example 4

About 26 gs. of asymetric difluorodichloroethylene ($CF_2=CCl_2$) maintained at $-78°$ C. was saturated with oxygen by bubbling oxygen through the liquid monomer. The reaction mixture was then heated at about $70°$ C. for about 48 hours. Approximately 0.7 gs. was recovered of a polymer with a very high softening point, e. g., it did not melt up to $300°$ C., which indicated its usefulness as a plastic.

Thus, by means of the present invention, polymers consisting essentially of carbon and halogen with a high fluorine content that are resistant to corrosive substances such as acids, alkalies, the halogens, etc. are produced, of relatively high molecular weights such that the polymers are useful as plastics or for the production of lubricating oils and greases by cracking. The process developed is convenient, safe and inexpensive. The use of oxygen as a polymerization promoter is also advantageous for use with continuous flow polymerization processes. Oxygen may be conveniently provided and metered under high pressures either as a gas or in solution without the precautions necessary to avoid decomposition of an organic peroxide.

Since many embodiments might be made of the present invention and since many changes might be made in the embodiment described, it is to be understood that the foregoing description is to be interpreted as illustrative only and not in a limiting sense.

I claim:

1. A method useful for producing polymers which soften above $200°$ C. which comprises heating an olefin selected from the group of trifluoromonochloroethylene and difluorodichloroethylene at a temperature in the range of 40° C. to 150° C. in the presence of elemental oxygen as a polymerization promoter to produce a solid polymer.

2. A method useful for producing polymers which soften above 200° C. which comprises heating an olefin selected from the group of trifluoromonochloroethylene and difluorodichloroethylene at a temperature in the range of 60° C. to 100° C. in the presence of elemental oxygen as a polymerization promoter to produce a solid polymer and separating the polymer so produced from the reaction products.

3. A method useful for producing polymers which soften above 200° C. which comprises heating an olefin selected from the group of trifluoromonochloroethylene and difluorodichloroethylene at a temperature in the range of 40° C. to 150° C. in the presence of 0.001% to 0.4% elemental oxygen to produce a solid polymer and separating the polymer so produced from the reaction products.

4. A method useful for producing polymers which soften above 200° C. which comprises heating an olefin selected from the group of trifluoromonochloroethylene and difluorodichloroethylene at a temperature in the range of 40° C. to 150° C. in the presence of 0.001% to 0.05% elemental oxygen to produce a solid polymer and separating the polymer so produced from the reaction products.

5. A method useful for producing polymers which soften above 200° C. which comprises heating trifluoromonochloroethylene at a temperature in the range of 60° C. to 100° C. in the presence of 0.001% to 0.4% elemental oxygen to produce a solid polymer and separating the polymer so produced from the reaction products.

6. A method useful for producing polymers which soften above 200° C. which comprises heating asymetric difluorodichloroethylene at a temperature in the range of 60° C. to 100° C. in the presence of a relatively minor proportion of elemental oxygen to produce a solid polymer and separating the polymer so produced from the reaction products.

7. A method of making a polymer consisting essentially of carbon and halogen with a high percentage of fluorine which comprises maintaining trifluoromonochloroethylene in contact with elemental oxygen at a temperature not higher than about −20° C. to produce the peroxide of trifluoromonochloroethylene in situ, and thereafter heating said trifluoromonochloroethylene containing said peroxide at a temperature in the range of 60° C. to 100° C. to produce a solid polymer and separating the polymer so produced from the reaction products.

8. The method for making a polymer consisting essentially of carbon and halogen with a high percentage of fluorine which comprises maintaining an olefin selected from the group of trifluoromonochloroethylene and difluorodichloroethylene in contact with elemental oxygen at a temperature not higher than about −20° C. to produce the peroxide of said olefin in situ, and thereafter heating said olefin containing said peroxide at a temperature in the range of 40° C. to 150° C. to produce a solid polymer and separating the polymer so produced from the reaction products.

9. A method useful for producing polymers which soften above 200° C. which comprises heating an olefin selected from the group of trifluoromonochloroethylene and difluorodichloroethylene at a temperature in the range of 60° C. to 100° C. under substantially anhydrous conditions in the presence of elemental oxygen as a polymerization promoter to produce a solid polymer.

WILLIAM T. MILLER.

REFERENCES CITED

The following references are of record in the file of this patent:

UNITED STATES PATENTS

| Number | Name | Date |
|---|---|---|
| 2,369,520 | Barnes | Feb. 13, 1945 |
| 2,394,243 | Joyce | Feb. 5, 1946 |

FOREIGN PATENTS

| Number | Country | Date |
|---|---|---|
| 465,520 | Great Britain | May 3, 1937 |
| 590,390 | Great Britain | July 16, 1947 |

OTHER REFERENCES

Miller et al.: Ind. Eng. Chem. 39, 333–337, March 1947.